T. S. DAVIS.
Piston.

No. 160,752.

Patented March 16, 1875.

Witnesses.
Wm Edwards
William R. Whitney

Inventor.
Thomas S. Davis
per
James A. Whitney
Atty

UNITED STATES PATENT OFFICE.

THOMAS S. DAVIS, OF JERSEY CITY, NEW JERSEY.

IMPROVEMENT IN PISTONS.

Specification forming part of Letters Patent No. 160,752, dated March 16, 1875; application filed February 2, 1875.

*To all whom it may concern:*

Be it known that I, THOMAS S. DAVIS, of Jersey City, in the county of Hudson and State of New Jersey, have invented certain Improvements in Pistons, of which the following is a specification:

This invention is more especially applicable for use as a piston-valve, but may also be applied in the construction of pistons for other purposes.

It comprises a piston constructed with a divided ring formed with inwardly-projecting lugs, which are compressed by a screw upon a removable adjusting-plate arranged between the adjacent end of the divided ring in such manner that, by using adjusting-plates of various thicknesses, the circumference of the piston may, without impairing the solidity of the piston, be accurately adjusted to fit the cylinder or bearings in which it may be designed to work.

To compensate for wear, or for other reasons, the invention further comprises a novel combination of flanged and rabbeted end disks, with the divided ring, the compressing-screw, the adjusting-plate, and the piston-stem, whereby the convenient construction and putting together of the piston are greatly facilitated, and great strength, solidity, and permanence in its structure are secured.

Figure 1:
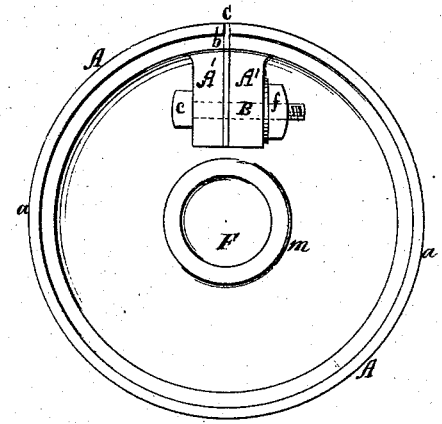
Figure 2:
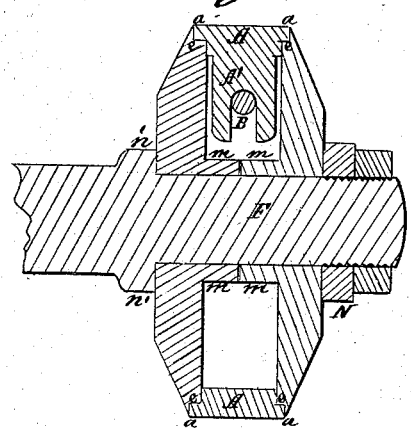
Figure 4:
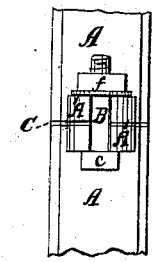
Figure 3:
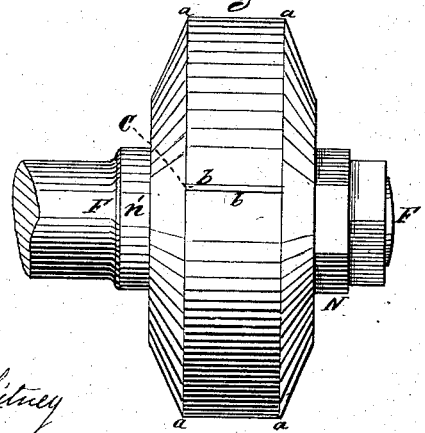

Figure 1 is an end view of a piston made according to my invention. Fig. 2 is a longitudinal sectional view thereof. Fig. 3 is a side view of the same, and Fig. 4 is an internal view of one portion of the same.

A is a ring, the outer circumferential face, *a*, of which forms the wearing-surface of the piston. This ring is divided in the plane of its axis, as shown at *b*, each of the adjoining ends thus provided being formed with an inwardly-projecting lug, A'. In these lugs are provided suitable holes, in line with each other, through which is passed a bolt, B, having a head, *c*, at one end, a screw-thread, and a nut, *f*, on the other. Between the aforesaid ends of the divided ring A, and of course between the lugs as well, is placed a thin packing, C, of leather, metal, oakum, or other material, the thickness of which will vary according to the extent to which it is desired to expand the circumference of the ring.

By tightening the nut *f* upon the bolt or screw the lugs will be made to compress the packing, and the exterior of the ring, including the external surface of the packing, will be made continuous, and the ring itself solid and firm.

The ring is shouldered at its edges *a* to fit into rabbets *e* formed in the inner peripheries of the two heads D, which are bored axially to secure the end of the piston-stem F, and around their said bores are formed with internally-projecting flanges *m*, which steady the heads in position upon the stem, while the rabbets *e*, receiving the edges of the ring, serve to hold the same against lateral displacement, and at the same time to retain it perfectly concentric with the piston-stem. The latter being furnished with a shoulder, *n'*, at one end of the piston, and with one or more nuts, N, screwed upon the opposite portion of said stem, the nuts, when screwed home, firmly bind the heads to their places upon the stem, and also compress the said heads upon the edges of the ring, to hold the same in due relation to them.

It will be seen that, as thus constructed, the entire piston is very firm and solid, and that by removing the nuts, the piston may be readily taken apart to permit a packing of any desired thickness between the ends of the divided ring A, to enlarge or diminish, as the case may be, the circumference to the piston to adapt it to the cylinder or chamber in which it is designed for use.

The piston being thus readily adjustable, its screw may be readily and easily compensated with great accuracy, and its perfect working, steam or water tight, without undue friction, is effectually provided for.

What I claim as my invention is—

1. The piston constructed with the divided ring A, provided with lugs on its adjacent ends, compressed upon the packing C by means of the bolt or screw, substantially as and for the purpose set forth.

2. The flanged and rabbeted heads, the divided ring, having the lugs on its adjacent ends, the compressing bolt or screw, and the piston-stem, the whole arranged for operation substantially as and for the purpose set forth.

THOMAS S. DAVIS.

Witnesses:
JAMES A. WHITNEY,
W. M. EDWARDS.